United States Patent
Marais et al.

(10) Patent No.: US 9,613,097 B2
(45) Date of Patent: *Apr. 4, 2017

(54) DYNAMIC RESULT SET CACHING WITH A DATABASE ACCELERATOR

(71) Applicant: International Business Machines Corporation, Armonk, NY (US)

(72) Inventors: Arthur Marais, Montgomery, TX (US); Christopher J. Munson, Los Gatos, CA (US); Nigel G. Slinger, Los Gatos, CA (US); John B. Tobler, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/551,845

(22) Filed: Nov. 24, 2014

(65) Prior Publication Data

US 2015/0254245 A1 Sep. 10, 2015

Related U.S. Application Data

(63) Continuation of application No. 14/196,562, filed on Mar. 4, 2014.

(51) Int. Cl.
*G06F 17/30* (2006.01)
*G06F 11/07* (2006.01)

(52) U.S. Cl.
CPC ........ *G06F 17/3048* (2013.01); *G06F 11/073* (2013.01); *G06F 17/30371* (2013.01); *G06F 17/30581* (2013.01)

(58) Field of Classification Search
CPC combination set(s) only.
See application file for complete search history.

(56) References Cited

U.S. PATENT DOCUMENTS 8,468,151 B2 6/2013 Branscome et al.
8,504,437 B1 * 8/2013 Agarwal ............... G06F 17/30
705/14.54

(Continued)

FOREIGN PATENT DOCUMENTS

WO 2003071447 A2 8/2003

OTHER PUBLICATIONS

Bruni, P. et al.; "Optimizing DB2 Queries with IBM DB2 Analytics Accelerator for z/OS"; IBM Corporation; http://www.ibm.com/redbooks/sg24-8005-00 . . . ; Aug. 2012.

(Continued)

*Primary Examiner* — Shyue Jiunn Hwa
(74) *Attorney, Agent, or Firm* — Mohammed Kashef; SVL IP Law Edell, Shapiro & Finnan, LLC

(57) ABSTRACT

According to one embodiment of the present invention, a system for processing a database query stores one or more result sets for one or more first database queries in a data store. The system receives a second database query and compares the second database query to the one or more first database queries to determine presence of a corresponding result set in the data store for the second database query. The system provides the corresponding result set from the data store for the second database query based on the comparison. Embodiments of the present invention further include a method and computer program product for processing a database query in substantially the same manners described above.

7 Claims, 5 Drawing Sheets

(56) References Cited

U.S. PATENT DOCUMENTS

| | | | |
|---|---|---|---|
| 2004/0193656 A1 | 9/2004 | Pizzo et al. | |
| 2009/0077011 A1 | 3/2009 | Natarajan et al. | |
| 2011/0016108 A1* | 1/2011 | Pelenur | G06F 17/30864 707/722 |
| 2014/0181071 A1* | 6/2014 | Pidduck | G06F 17/30117 707/711 |
| 2014/0310232 A1* | 10/2014 | Plattner | G06F 17/3048 707/602 |

OTHER PUBLICATIONS

IBM; "DB Write Accelerator"; An IP.com Prior Art Database Technical Disclosure; http://ip.com/IPCOM/000159668D; Oct. 24, 2007.

Oracle, "20 Statement and Result Set Caching" Oracle® Database JDBC Developer's Guide and Reference, 11g Release 1 (11.1), http://docs.oracle.com/cd/B28359_01/java.111/b31224/stmtcach.htm#CBHFBIDB; Retrieved Feb. 5, 2014.

* cited by examiner

DYNAMIC RESULT SET CACHING WITH A DATABASE ACCELERATOR

CROSS-REFERENCE TO RELATED APPLICATIONS

This application is a continuation of U.S. patent application Ser. No. 14/196,562, entitled "DYNAMIC RESULT SET CACHING WITH A DATABASE ACCELERATOR" and filed Mar. 4, 2014, the disclosure of which is incorporated herein by reference in its entirety.

BACKGROUND

Present invention embodiments relate to database systems, and more specifically, to dynamically and asynchronously caching query result sets of accelerated database queries. Some database platforms use accelerator systems to improve response times for complex, data-intensive database queries. An accelerator system is typically a supplemental appliance—separate from the primary database system—that includes dedicated hardware for rapid data access and processing. A portion of the data from the database (e.g., data that is static or changes infrequently) is loaded into the accelerator system. When the primary database system receives a query against this data, it may send the query to the accelerator system, which applies the query against the previously loaded data and returns a result set to the primary database system. The primary database system in turn sends the result set to the user or application that submitted the query. The accelerator system may produce results many times faster than the primary database system would itself. However, the response may still take minutes or even hours of processing time.

SUMMARY

According to one embodiment of the present invention, a system for processing a database query stores one or more result sets for one or more first database queries in a data store. The system receives a second database query and compares the second database query to the one or more first database queries to determine presence of a corresponding result set in the data store for the second database query. The system provides the corresponding result set from the data store for the second database query based on the comparison. Embodiments of the present invention further include a method and computer program product for processing a database query in substantially the same manners described above.

BRIEF DESCRIPTION OF THE SEVERAL VIEWS OF THE DRAWINGS

Generally, like reference numerals in the various figures are utilized to designate like components.

DETAILED DESCRIPTION

Present invention embodiments relate to caching result sets of accelerated database queries. For example, an accelerator system may generate a result set for a query and write the result set to a file on a local data store. The accelerator system may use heuristics to determine which result sets to cache when constrained by available storage space. From time to time, the accelerator system may invalidate cached results sets (e.g., in response to specified types of changes to the data from which they were derived) and remove those results sets from the data store.

One aspect of a present invention embodiment is to reduce response times and processing resources required on a database accelerator system. The response time for a cached query is reduced by the amount of time it takes the accelerator system to execute the query minus the amount of time it takes to retrieve the cached result set from the data store. For example, the response time for a query may be reduced from sixty minutes to a few seconds. Common repeated queries take three to five minutes to process, which may be reduced to less than a second, depending on the size of the result set. Typical response time reductions may be on the order of 98% for a cached accelerated query.

Another aspect of a present invention embodiment is to improve performance with regard to database queries driven by reporting tools (e.g., web-based reports, CRYSTAL REPORTS®, etc.). For example, an organization may generate reports on a yearly, quarterly, and/or monthly basis. When each report is announced, it may be accessed and generated dynamically by members of each of several departments within the organization. As a result, the same query or queries are submitted repeatedly to a database. Many queries distributed to accelerator systems arise in this manner. Caching the results may avoid repeated query execution that consumes costly resources on the accelerator and slows down or defers other accelerated query executions.

Still another aspect of a present invention embodiment is to cache result sets for accelerated queries dynamically and asynchronously. Users submitting queries need not indicate those queries for which the results are to be cached, nor be aware of changes to the underlying data.

Figure 1:
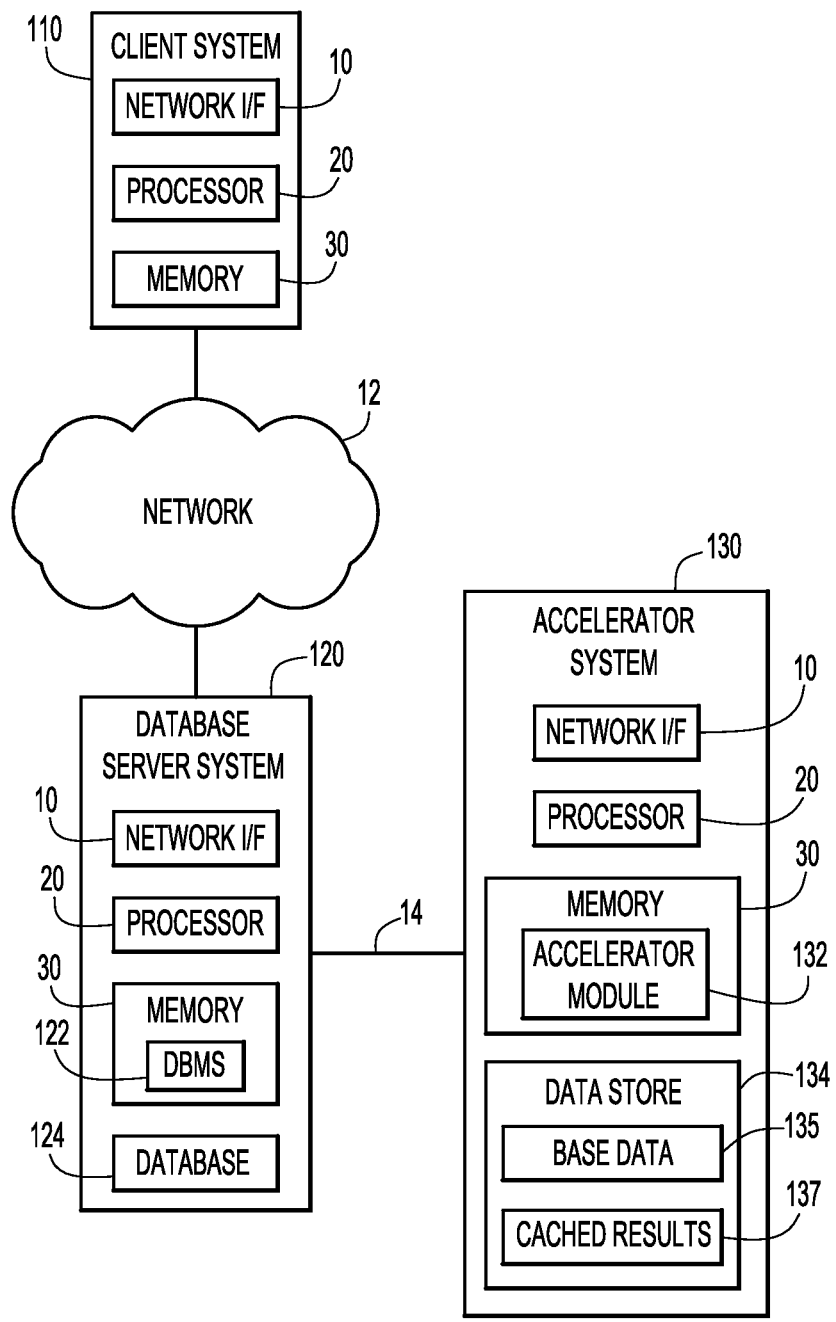
FIG. 1 is a diagrammatic illustration of an example computing environment for an embodiment of the present invention.

An example environment for present invention embodiments is illustrated in FIG. 1. Specifically, the environment includes one or more client or end-user systems 110, one or more database server systems 120, and one or more database accelerator systems 130. Client systems 110 and database server systems 120 may be remote from each other and communicate over a network 12. Database server systems 120 and accelerator systems 130 may communicate via a local data link 14. Network 12 may be implemented by any number of any suitable communications media (e.g., wide area network (WAN), local area network (LAN), Internet, intranet, etc.). Alternatively, any combination of any numbers of client systems 110, database server systems 120, and accelerator systems 130 may be local or remote to each other, and communicate via any appropriate network (e.g., network 12) or local communication medium (e.g., local area network (LAN), hardwire, wireless link, intranet, etc.).

A database server system 120 includes a database management system (DBMS) 122 and database 124 (e.g., a relational database management system and relational database, respectively). The DBMS and/or database may be implemented across plural database server systems. Alternatively, the DBMS and/or database may reside on a client system 110 or other computer system in communication with the client system.

An accelerator system includes accelerator module 132 and data store 134. Data store 134 contains base data 135 (e.g., data loaded into the accelerator system from database 124) and cached query results 137. Data store 134 may be implemented, for example, by any type(s) of computer readable storage media. Typical accelerator systems include large amounts of inexpensive disk space.

Client systems 110 enable users to communicate with the DBMS (e.g., via network 12). The client systems may present any graphical user (e.g., GUI, etc.) or other interface (e.g., command line prompts, menu screens, etc.) to receive commands from users and interact with the DBMS and/or other modules or services.

Client systems 110, database server systems 120, and accelerator systems 130 may be implemented by any conventional or other computer systems optionally equipped with a display or monitor, a base (e.g., including at least one processor 20, memories 30 and/or internal or external network interface or communications devices 10 (e.g., modem, network cards, etc.), optional input devices (e.g., a keyboard, mouse, or other input device), and any commercially available and custom software (e.g., DBMS software, accelerator software, etc.). For example, an accelerator system 130 may include an array of computing systems for processing data for a database query in parallel.

Figure 2:
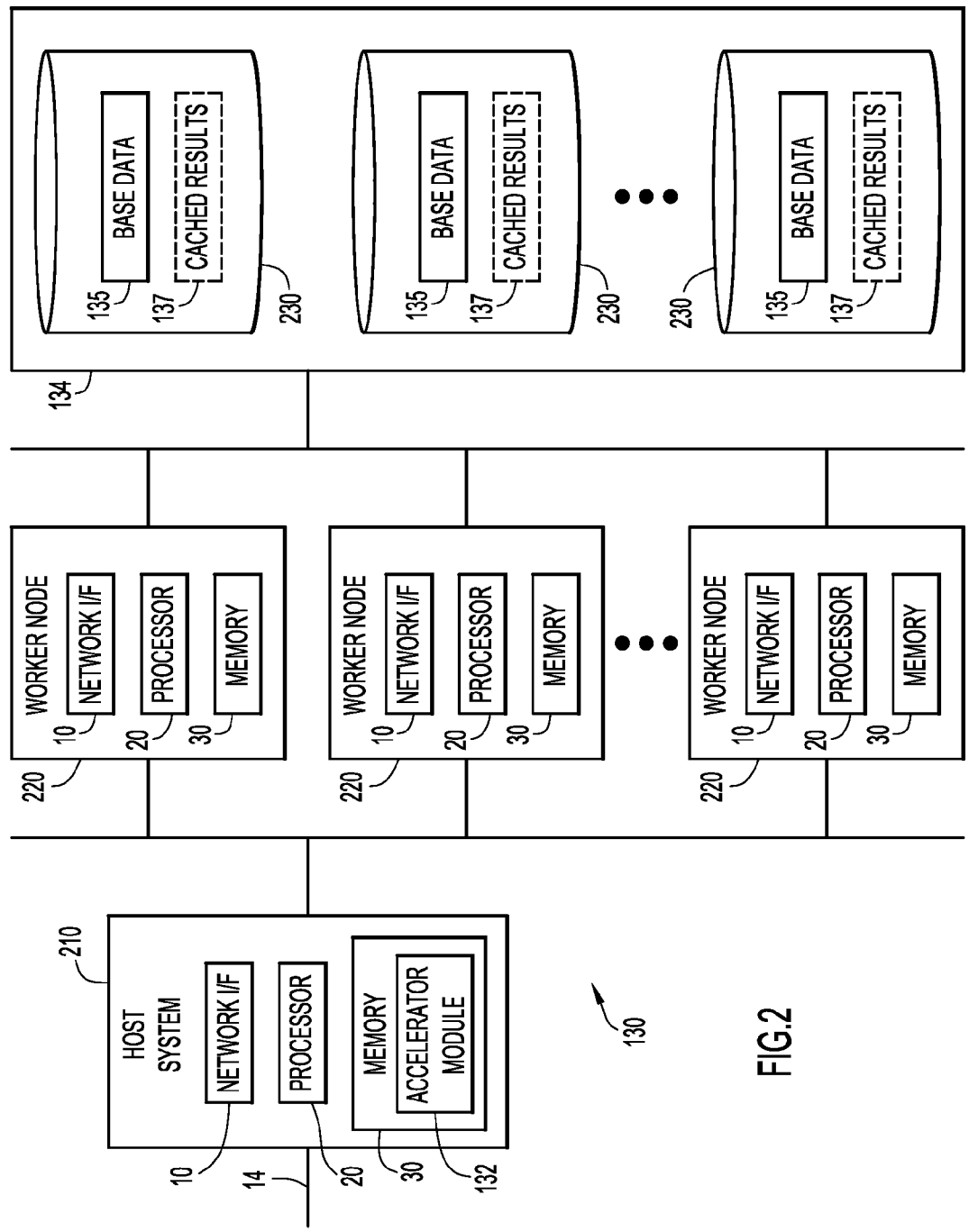
FIG. 2 is a block diagram of an example accelerator system according to an embodiment of the present invention.

An example parallel processing accelerator system according to an embodiment of the present invention is illustrated in FIG. 2. In particular, the accelerator system includes a host system 210, worker nodes 220, and data store 134. Host system 210 includes accelerator module 132, and communicates (e.g., via data link 14) with DBMS 122, worker nodes 220, and has direct or indirect (e.g., via work nodes 220) access to data store 134. In one embodiment, host system 210 is implemented by a conventional computer system, worker nodes 220 are implemented by blade servers, and data store 134 is implemented by an array of data storage devices 230. Host system 210 and worker nodes 220 each include one or more processor(s) 20, memories 30, and internal or external network interface or communications devices 10. Each worker node may be associated with one or more storage units 230 and dedicated hardware (e.g., a field-programmable gate array (FPGA)) (not shown) for data decompression, data filtering, and the like.

Accelerator module 132 may include one or more modules or units to perform the various functions of present invention embodiments described below (e.g., loading data into the accelerator system, updating data in the accelerator system, applying queries against data in the accelerator system, determining results to cache, storing results, returning cached results, invalidating cached results, removing cached results, etc.), may be implemented by any combination of any quantity of software and/or hardware modules or units, and may reside within memory 30 of accelerator system 130 (e.g., within memory 30 of host system 210) for execution by processor 20.

Initially, some or all of the information from database 124 is loaded into accelerator system 130. For example, a database administrator or manager may specify tables or parts of tables to be sent from database 124 to accelerator system 130. The data is received at the accelerator system (e.g., by host system 210) and written (e.g., via worker nodes 220) to data store 134 to form base data 135. Base data 135 may have a different format than data stored in database 124 (e.g., base data 135 may be compressed). From time to time, the data loaded into the accelerator may be updated. For example, some or all tables in the base data 135 may be replaced entirely with a new snapshot of information from database 124. Alternatively, changes to database 124 may be propagated incrementally to the base data 135.

When DBMS 122 receives a query (e.g., from client system 110 via network 12), the DBMS determines whether to direct the query to the accelerator system. For example, if the required data has been loaded into the accelerator system, and the accelerator system is capable of performing the required operations, the DBMS may send the query to the accelerator system. A user who submits a query to the database server system need not be aware of whether the query is processed on the accelerator system or on the database server system itself.

Figure 3:
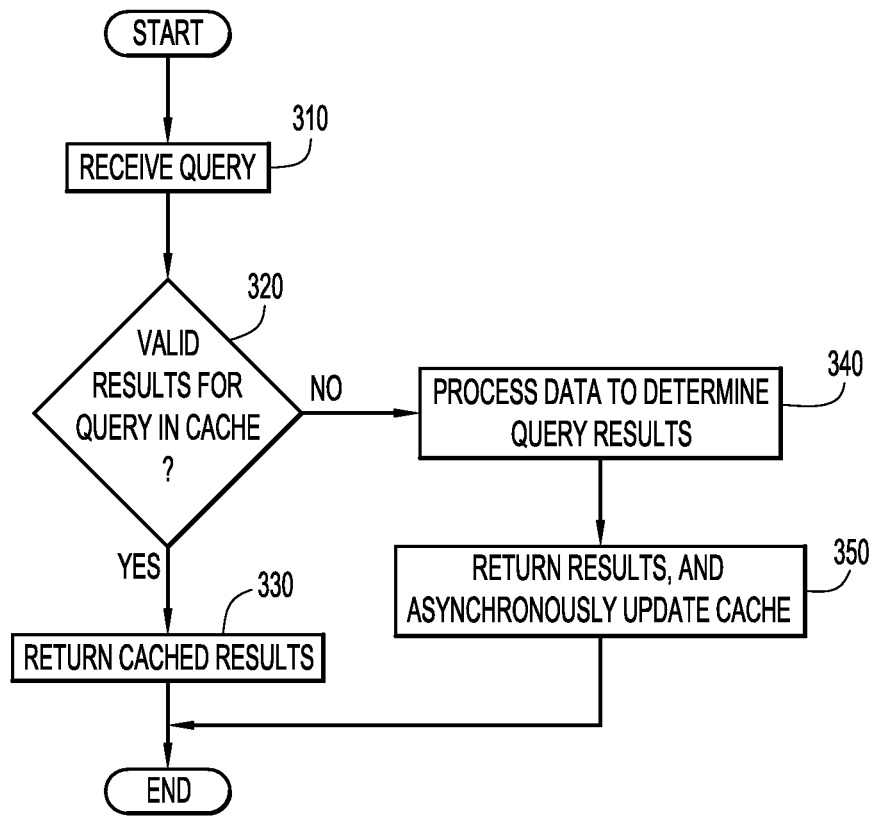
FIG. 3 is a flow diagram illustrating an example manner of responding to a query on an accelerator system according to an embodiment of the present invention.

An example manner of handling a query on an accelerator system according to an embodiment of the present invention is illustrated in FIG. 3. Initially, accelerator module 132 receives a query from database server system 120 (e.g., via data link 14) at step 310. At step 320, the accelerator module determines whether valid cached results 137 for the query exist within data store 134. For example, the received query may be in the form of a structured query language (SQL) statement, and the accelerator module may look for a string matching that SQL statement in a list of queries previously processed by the accelerator system. If a match is found, the accelerator module may verify that valid cached results 137 for the previously processed query reside in data store 130. For example, the accelerator module may check that a file containing the results exists within the data store and has not been marked invalid (e.g., because of changes to the underlying data since the previous query was processed). If valid results for the query exist within the data store, the accelerator module accesses those results and returns them to DBMS 122 at step 330.

If valid results for the query do not exist within the data store, results for the query are generated by processing part or all of base data 135 at step 340. For example, host system 210 may partition processing for the query into one or more jobs, compile each job into machine executable code, and distribute the code to one or more worker nodes 220 to be executed in parallel. Each worker node reads the required base data from its associated storage unit(s) 230, performs parallelizable operations of the query (e.g., filtering, computing partial sums, etc.), and returns data to the accelerator module on the host system. The accelerator module may collate this data as necessary to form a result set for the query.

At step 350, the accelerator module returns the generated result set to DBMS 122, and updates the cached results in the data store (e.g., by writing the generated result set to a file and optionally deleting old results) at step 350. The accelerator module may update the cached results asynchronously to generating and returning results to the DBMS. For example, the accelerator system may buffer the results in memory and write them to a file in the data store after returning them to the DBMS. Alternatively, the accelerator system may write results to the data store concurrently or partially concurrently (e.g., via a separate optionally lower priority process or thread) to returning the results to the DBMS.

Figure 4:
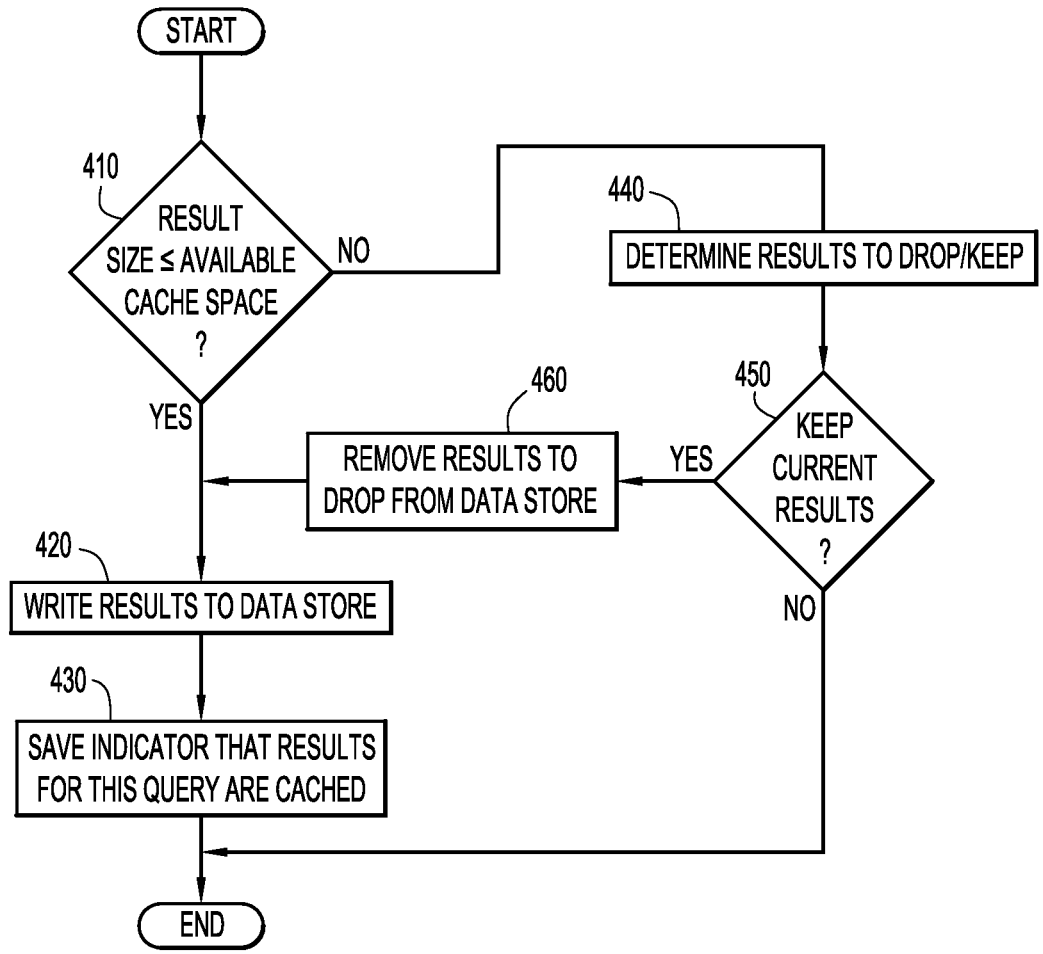
FIG. 4 is a flow diagram illustrating an example manner of updating a cache on an accelerator system according to an embodiment of the present invention.

An example manner of updating cached results in the data store of an accelerator system according to an embodiment of the present invention is illustrated in FIG. 4. Initially, at step 410, the accelerator module determines whether the newly generated results for the current query will fit within available space for cached results in the data store. The available space may be a user-configurable portion (e.g., a percentage, fixed amount, etc.) of the data store allocated for caching query results. A user may specify that the available portion is zero to disable caching of results. If the results will fit within the available space, the accelerator module writes the results to the data store at step 420. For example, the results may be written to a file, stored in a database, or the like. At step 430, the accelerator module saves an indication that results for the current query have been cached in the data store. For example, the query may be stored in a list of queries having cached results, or the query may be flagged as having cached results in a list of previously processed queries.

If the accelerator module determines at step 410 that the results will not fit within the available space, the accelerator module determines at step 440 which result sets to keep in the data store. For example, the accelerator module may omit writing a newly generated result set to the data store if there is insufficient available space. Alternatively, the accelerator module may delete older cached result sets from the data store (e.g., in the order in which they were generated or the time since they were most recently accessed) until sufficient space is available to store the new result set. In general, the accelerator module may use any heuristics (e.g., based on the complexity of the underlying query, age of the result set, frequency of access, size of the result set, etc.) to determine which result sets to add, keep, or remove from the cache. For example, the accelerator module may delete older cached result sets from the data store as necessary if the current query took more than a predetermined amount of time to process (e.g., 1 cpu second, 1 minute, etc.) and the result sets to be deleted from the data store have each been accessed with less than a predetermined average frequency (e.g., once per hour over the past day, once per day over the past hour, etc.). Determination of the result sets to maintain in the cache may use estimates of performance for different cache contents based on access models, trial and error, machine optimization techniques, etc.

At step 450, the accelerator module determines whether the group of result sets to be cached includes the current, newly generated result set. If not, the current result set is discarded and processing ends. Otherwise, at step 460, one or more previously cached result sets are deleted from the data store to make room for the current result set, and processing proceeds to step 420.

Figure 5:
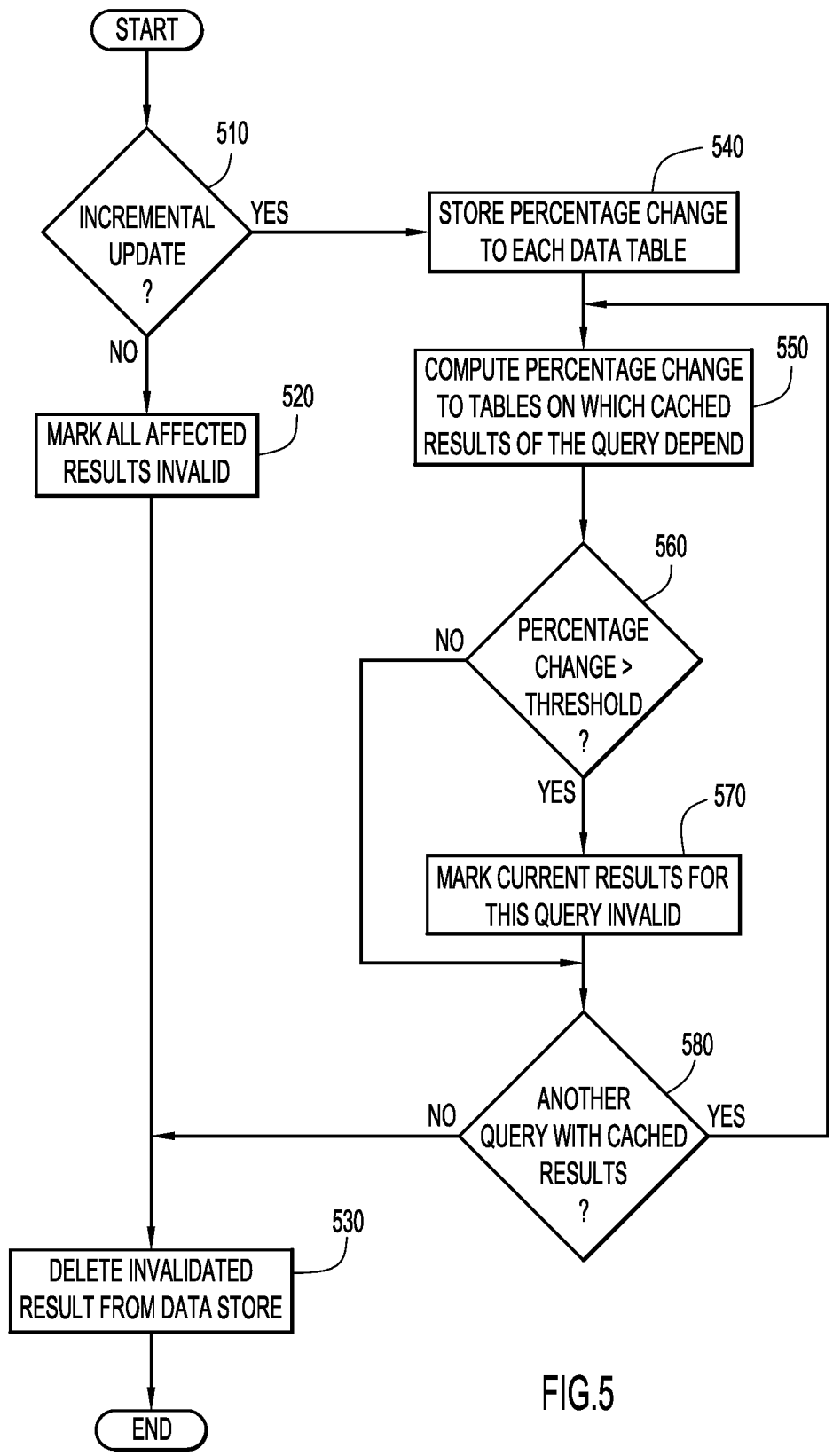
FIG. 5 is a flow diagram illustrating an example manner of invalidating cached results in response to an update of the underlying data on an accelerator system according to an embodiment of the present invention.

An example manner of invalidating cached results in response to an update of the base data on an accelerator system according to an embodiment of the present invention is illustrated in FIG. 5. Initially, the accelerator module determines whether the update is a bulk update or an incremental update at step 510. A bulk update may, for example, replace a database table entirely, whereas an incremental update may, for example, add, delete, or update rows of a database table. In the case of a bulk update, the accelerator module marks invalid all cached result sets derived from the affected data at step 520. For example, the accelerator module may determine affected queries by examining each query in a list of queries for which the results are cached, determine the names of tables accessed by the query, and compare those table names to the names of tables included in the bulk update. For each affected query, the accelerator module may mark the cached result set invalid by, for example, setting a flag in the list queries, writing an indicator to the data store (e.g., changing the name of the file containing the result set, writing to a persistent list of invalid result sets, etc.), or the like. Result sets marked invalid are deleted synchronously or asynchronously from the data at step 530. For example, the accelerator module may delete the files promptly or schedule them for deletion at a later time. Alternatively, a separate process or thread may periodically purge result sets marked for deletion.

In the case of an incremental update, the accelerator module (or a separate update process) may record relative degrees of changes to the base data at step 540. For example, the date and time of the update and the percentage of rows changed in each table may be stored. At step 550, the accelerator module computes a measure of the changes to the underlying data for a cached result set since the result set was generated. For example, for each table underlying a cached result set, the accelerator module may sum the percentage changes to the table since the query was processed. The maximum of these changes for tables underlying the cached result set may be the measure of changes. At step 550, the accelerator module compares the measure of changes to a predetermined threshold. For example, the maximum summed percentage change to a table underlying the result set may be compared to a predetermined threshold percentage value (e.g., 0.1%, 1%, 5%, etc.). If the measure of changes exceeds the predetermined threshold, the result set is marked invalid at step 570. At step 580, the accelerator module determines whether another cached result set remains to be tested for validity. If so, processing returns to step 550. Otherwise, processing proceeds to step 530.

It will be appreciated that the embodiments described above and illustrated in the drawings represent only a few of the many ways of implementing embodiments for caching accelerated database query results.

The environment of the present invention embodiments may include any number of computer or other processing systems (e.g., client or end-user systems, server systems, etc.) and storage systems (e.g., file systems, databases, or other repositories), arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., database software, communications software, etc.). These systems may include any types of monitors and input devices (e.g., keyboard, mouse, voice recognition, touch screen, etc.) to enter and/or view information.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, intranet, Internet, hardwire, modem connection, wireless, etc.). For example, the functions of the present invention embodiments may be distributed in any manner among various server systems, end-user/client and/or any other intermediary processing devices including third party client/server processing devices. The software and/or algorithms described above and illustrated in the flow charts may be modified in any manner that accomplishes the functions described herein. In addition, the functions in the flow charts or description may be performed in any order that accomplishes a desired operation.

The communication network may be implemented by any number of any types of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of data storage systems and structures to store information. The data storage systems may be implemented by any number of any conventional or other databases, file systems, caches, repositories, warehouses, etc.

The present invention embodiments may employ any number of any type of user interface (e.g., Graphical User Interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, touch screen, pen, etc.).

It is to be understood that the software of the present invention embodiments could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The present invention embodiments are not limited to the specific tasks, algorithms, parameters, data, or network/environment described above, but may be utilized for caching any type of accelerated query results (e.g., queries generated by reporting software, ad hoc queries, relational or other database queries, online analytical processing (OLAP) queries, document search engine queries, etc.).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of processing a database query comprising:
   processing, via at least one processor, one or more first database queries against a data set to produce corresponding result sets;
   storing, via at least one processor, one or more result sets for the one or more first database queries in a data store;
   determining, via at least one processor, an amount of data changed within the data set for an update applied to data of the data set after processing the one or more first database queries and discarding one or more stored result sets associated with the changed data in response to the amount of changed data exceeding a threshold amount of changed data, wherein discarding one or more stored result sets includes:
   discarding all stored result sets derived from changed data in response to a bulk update applying changes to entireties of database objects; and
   discarding one or more result sets based on the amount of changed data in response to an incremental update applying changes to elements of the database objects;
   receiving and processing a second database query, via at least one processor, wherein processing the second database query comprises:
   comparing the second database query to the one or more first database queries to determine previous processing of the second database query and presence of a corresponding result set in the data store for the second database query; and
   reducing a response time of the at least one processor for processing the second database query by providing the corresponding result set from the data store as results for the second database query to avoid repeated query execution based on the comparison indicating the second database query has been previously processed.

2. The method of claim 1, wherein the one or more first database queries and the second database query are processed by a database accelerator.

3. The method of claim 1, wherein the threshold amount of changed data includes a user-specified threshold.

4. The method of claim 1, wherein providing the corresponding result set from the data store includes:
   providing the corresponding result set from the data store in response to the second database query matching a previously processed one of the first database queries.

5. The method of claim 1, wherein the data store includes a cache that is allocated a user-specified portion of disk space.

6. The method of claim 1, wherein storing the one or more result sets comprises determining available space in the data store.

7. The method of claim 6, wherein determining available space in the data store comprises discarding a result set.

* * * * *